US012554459B2

(12) United States Patent
Rauhala

(10) Patent No.: US 12,554,459 B2
(45) Date of Patent: Feb. 17, 2026

(54) PRE-RECEIVED AUDIO PLAYBACK FUNCTION IN WATERPROOF HEADPHONES

(71) Applicant: Finnovate Group, LLC, Solana Beach, CA (US)

(72) Inventor: Kari Kristian Rauhala, Solana Beach, CA (US)

(73) Assignee: Finnovate Group LLC, Solana Beach, CA (US)

( * ) Notice: Subject to any disclaimer, the term of this patent is extended or adjusted under 35 U.S.C. 154(b) by 150 days.

(21) Appl. No.: 18/217,244

(22) Filed: Jun. 30, 2023

(65) Prior Publication Data

US 2024/0094979 A1 Mar. 21, 2024

Related U.S. Application Data

(60) Provisional application No. 63/407,339, filed on Sep. 16, 2022.

(51) Int. Cl.
| | | |
|---|---|---|
| H04R 1/10 | (2006.01) | |
| G06F 3/16 | (2006.01) | |
| H04R 1/44 | (2006.01) | |
| H04R 5/02 | (2006.01) | |

(52) U.S. Cl.
CPC ........... *G06F 3/165* (2013.01); *H04R 1/1091* (2013.01); *H04R 1/44* (2013.01); *H04R 2201/103* (2013.01); *H04R 2420/07* (2013.01)

(58) Field of Classification Search
CPC ......... G06F 3/165; H04R 1/1091; H04R 1/44; H04R 2201/103; H04R 2420/07

USPC .................................................. 381/74, 311
See application file for complete search history.

(56) References Cited

U.S. PATENT DOCUMENTS

| | | | | |
|---|---|---|---|---|
| 2009/0238536 | A1* | 9/2009 | Gratton | H04N 21/4341 |
| | | | | 386/E5.028 |
| 2018/0234190 | A1* | 8/2018 | Rauhala | G11B 20/10527 |
| 2020/0328824 | A1 | 10/2020 | Rauhala | |

OTHER PUBLICATIONS

International Searching Authority of the PCT (US); "Notification of Transmittal of the International Search Report and the Written Opinion of the International Searching Authority, or the Declaration" dated Oct. 5, 2023; PCT Application No. PCT/US23/26786; pp. 1-8 (2023).

* cited by examiner

*Primary Examiner* — Ammar T Hamid
(74) *Attorney, Agent, or Firm* — FisherBroyles LLP; James P. Cleary

(57) ABSTRACT

A system and method of playing streaming audio by a wireless audio delivery device, when the audio delivery device is in a wireless limited environment, includes connecting with a streaming media service via a streaming media application executing on an electronic communication device. A system and method further include receiving, by the streaming media application, streaming audio from the streaming media service, and storing the streaming audio in a memory associated with the audio delivery device when the audio delivery device is not in the wireless limited environment. The system and method further includes playing, by the audio delivery device, the streaming audio stored in the memory.

18 Claims, 2 Drawing Sheets

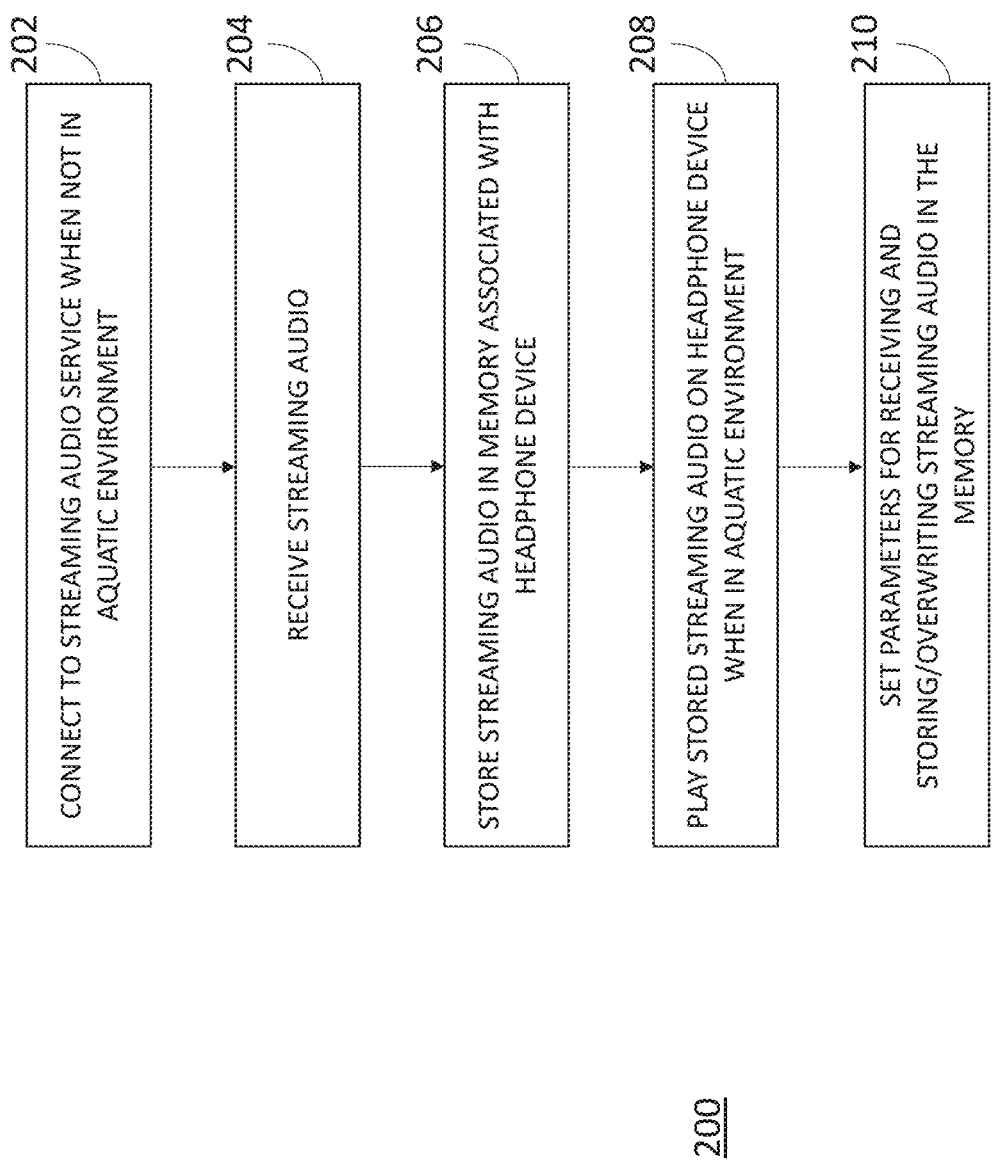

PRE-RECEIVED AUDIO PLAYBACK FUNCTION IN WATERPROOF HEADPHONES

CROSS REFERENCE TO RELATED APPLICATION

This application claims the benefit of priority from U.S. Provisional Application No. 63/407,339, filed Sep. 16, 2022, entitled "Pre-Received Audio Playback Function in Waterproof Headphones", the disclosure of which is incorporated, in its entirety by this reference.

BACKGROUND

Audio is transmitted to and received by a user via an audio delivery device, which typically includes loudspeakers such as speakers or headphones. The audio can include music, voice, or other audio signals. A headphone device can include full ear-covering headphones, or small ear-bud type headphones. More recently, a form of headphones that is gaining in popularity due to its wide applicability in various environments such as an aquatic environment includes bone conducting (BC) headphones utilizing BC loudspeakers.

Providing audio to a user through an audio delivery device such as speakers or headphones can occur in various ways, which can depend on an activity and/or an environment in which the user is listening to the audio. For example, in some activities, such as exercising, it may be preferable for the user to use wireless headphones or wireless speakers so that wired connections with an audio player device do not impede the user's movement or tether the user to a particular position. In an aquatic environment, the user may opt for a waterproof, wireless headphone device.

However, an aquatic environment presents unique challenges where wireless signals, such as Bluetooth®, are severely attenuated by water, making wireless connectivity with other parts of an audio delivery system hard to use, and foreclosing any possibility of receiving real-time streaming audio from a streaming media service such as Spotify®, Pandora®, Apple Music®, or the like. For instance, devices using wireless transmissions consistent with the Bluetooth® standard, where signals are transmitted between devices at the 2.4 GHz radio frequency, water molecules under the surface of water attenuate the Bluetooth signal to a range of less than 18 inches, and usually much less. In an aquatic environment, and to keep the headphone device as small and unobtrusive as possible, this typically requires the user to have their smartphone or other electronic communication device nearby on their person, so that the user has to carry two separate devices while in the aquatic environment.

Today, digital streaming music is the most popular form of listening to audio in all its forms, from a variety of popular streaming music services introduced above. In most implementations, streaming music takes the form of dynamically created and curated playlists of music that changes each time the user accesses the streaming music service, which mitigates boredom by the user repeatedly listening to a static pre-installed audio file, which can either be permanent or difficult to change.

Streaming music is typically received from a streaming server via the Internet, and conventionally occurs over a cellular or WiFi wireless connection using a smartphone or other cellular or WiFi-enabled electronic communication device such as a laptop or tablet computer. The user then connects their headphones or other loudspeakers to the smartphone or other electronic communication device to listen to the music, often using a low-power, short range wireless connection such as Bluetooth® that sends the audio stream to the user's headphones.

In most audio streaming services, the audio data stream is received in real-time, and the audio data stream typically cannot be recorded or copied by the user and transferred to memory without loss of fidelity. Further, various media protection provisions such as copyright law prevent a user from storing a stream, to protect against a user potentially unlawfully sharing the stream with third parties without compensating the streaming service. However, there is a need to capture and play streaming audio in a wireless limited environment such as an aquatic environment or a remote location, where there is no Internet connection such as via WiFi or cellular, or where other low-power, short range wireless connections such as Bluetooth® are ineffective.

SUMMARY

This document presents a system and method for audio playback on underwater waterproof wireless headphones (i.e., "headphone device") that have a capability to receive a wireless audio stream from one or more audio streaming services. The method includes receiving audio on the headphone device prior to their use in an aquatic environment and storing the pre-received audio to be played for the user when the user has the headphones in the aquatic environment.

In one aspect, a method of playing streaming audio by a wireless audio delivery device when the audio delivery device is in a wireless limited environment is described. The method includes connecting with a streaming media service via a streaming media application executing on an electronic communication device. The method further includes receiving, by the streaming media application, streaming audio from the streaming media service, and storing the streaming audio in a memory associated with the audio delivery device when the audio delivery device is not in the wireless limited environment. The method further includes playing, by the audio delivery device, the streaming audio stored in the memory.

In another aspect, a system for pre-loading streaming audio for playing by a wireless audio delivery device when in a wireless limited environment is presented. The system includes a streaming media application that is executable on an electronic communication device. The streaming media application is configured for connecting with a streaming media service and receiving streaming audio from the streaming media service. The system further includes a memory associated with the audio delivery device, the memory being configured to store the streaming media received from the streaming media service when the audio delivery device is not in the wireless limited environment. The system further includes one or more controls associated with the audio delivery device, the one or more controls being configured to play the streaming media stored in the memory when the audio delivery device is in the wireless limited environment.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 2 is a flowchart of a method of pre-loading of audio for waterproof headphones.

Like reference symbols in the various drawings indicate like elements.

DETAILED DESCRIPTION

Figure 1:
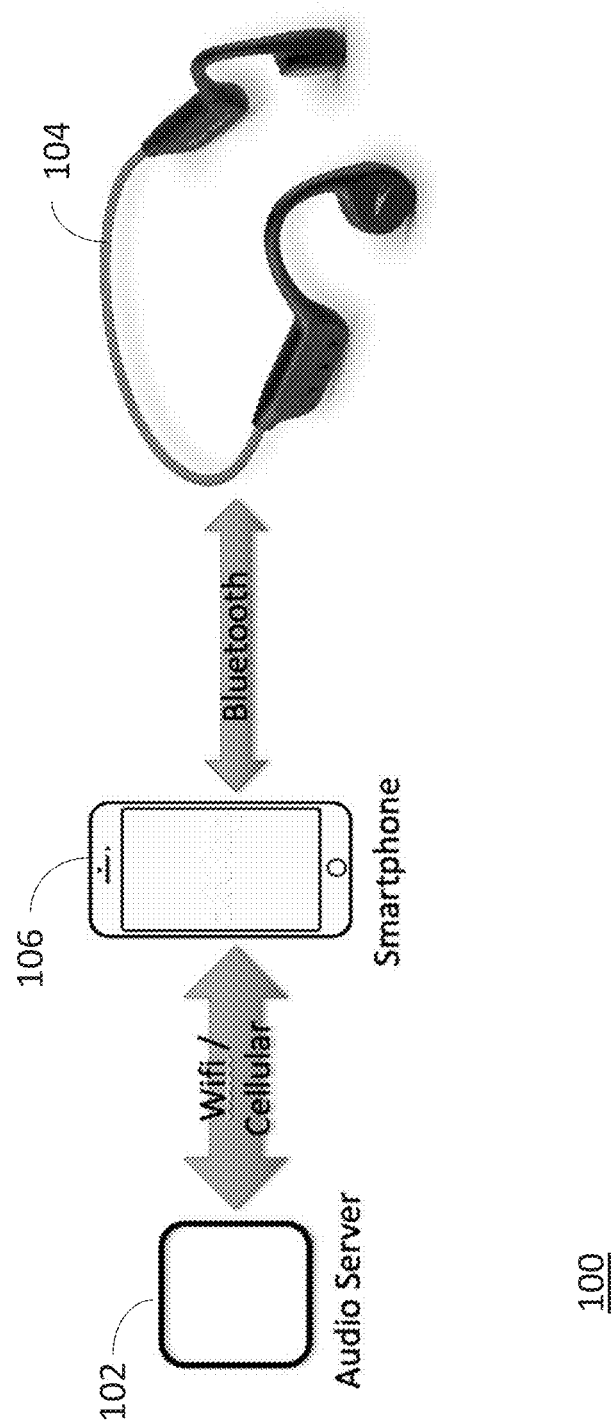
FIG. 1 is a system for pre-loading of audio for waterproof headphones.

Systems and methods for configuring and operating an audio delivery device in a wireless limited environment such as an aquatic environment or a remote location, where there is no Internet connection such as via WiFi or cellular, or where other low-power, short range wireless connections such as Bluetooth® are ineffective. The audio delivery device, which can be part of an audio player system, can include one or more loudspeakers such as a speaker or a headphone device configured to be worn on the head and proximate the ears of the user. The audio delivery device is preferably a standalone device that receives audio streams wirelessly via a short-range, low power wireless transmission channel such as Bluetooth® or WiFi.

In particular implementations, this document describes systems and methods for operating waterproof wireless headphones or a headphone device underwater or in other aquatic environments, where the headphone device is configured to receive the wireless audio stream from a normal audio streaming service or intermediary electronic communication device, and to store the wireless audio stream in a memory associated with the headphones to be able to be played exclusively for the user when the user is in the aquatic environment without interruption. The systems and methods described herein can include any type of audio delivery device, such as one or more loudspeakers or a headphone device.

In accordance with some implementations, and as illustrated in FIG. 1, a system 100 for playing streaming media such as audio from an audio server 102 through an audio delivery device 104 in an environment that is incompatible with short-range wireless transmissions of streaming audio, such as an aquatic environment. The audio delivery device 104 is depicted in FIG. 1 as being a wireless waterproof headphone device, such as a bone conducting headphone, but can also be a speaker with wireless capability. When not in such an environment, an electronic communication device 106 is connected to the Internet and to the audio server 102 providing a streaming audio service such as Spotify®, Pandora®, Apple Music®, or the like. The electronic communication device 106 is preferably connected to the streaming audio service via a wireless connection, such as a cellular connection, WiFi, Bluetooth®, or the like. The communication with the communication network can also be by wired connection.

The electronic communication device 106 can be an Internet-enabled smartphone, an audio player, a personal computer such as a laptop or desktop computer, or other communication-enabled device that can run a streaming media application to receive the streaming audio. In some alternative implementations, the electronic communication device 106 can be integrated with or in the audio delivery device 104 itself. For example, the audio delivery device 104 can be enabled for direct connectivity to the streaming audio service via any of the wired or wireless connections discussed above when not in the aquatic environment, therefore dispensing with the need for an intervening electronic communication device 106.

Once connected with the audio server 102, the electronic communication device 106 receives streaming audio and stores an amount of the audio received from the streaming audio service (the "stored audio"), preferably in a local memory or a memory associated with the electronic communication device 106 and controlled by a software application executed on the electronic communication device 106. The application is configured to manage the stored audio, such as transmitting the stored audio from the electronic communication device 106 to the audio delivery device 104 for playing the stored audio when the user uses the audio delivery device 104 in the aquatic environment.

In other implementations, the application on the electronic communication device 106 merely passes the audio stream from the audio server 102 directly to the audio delivery device 104 where it is stored and able to be played to the user. The audio delivery device 104 can include a number of control buttons for or controlling the playing of the stored audio such as play, pause, rewind or forward, shuffle, repeat, or the like. The audio delivery device 104 can include one or more visual interfaces, such as an LED, alphanumerical interface, or graphical interface, for providing information such as battery power level, audio artist, time remaining in a song or playlist, or other information related to the stored audio.

As discussed above, in some implementations the electronic communication device 106 can be the waterproof headphones 104, which can be configured to connect directly to the streaming audio service when the headphones are not in the aquatic environment, where being submerged in water can disrupt reception of the streaming audio.

As discussed herein, in some implementations the user uses a streaming audio application running on the electronic communication device 106 to connect to the audio streaming service. The electronic communication device 106 may also connect directly to the Internet via a wired or wireless connection to receive the audio stream via another application such as a browser.

Accordingly, the user can passively store any streaming audio to the audio delivery device 104 ahead of time, and then play the stored streaming audio as a stored file or set of files when swimming or under water. In some implementations, the audio delivery device 104 can communicate with the electronic communication device 106 a smartphone or other communication/computing device over a short-range wireless interface such as Bluetooth® using multiple applications. For instance, a first application can be an audio streaming application like Spotify®, Pandora®, Apple Music® or the like (i.e., a "streaming application"), and a second, separate application can be used to control the audio delivery device 104 (i.e., a "control application"). The control application can be used to control the audio delivery device 104 with such functions as audio start, stop, and pause the loading of audio, selecting a duration and/or amount of audio to store, or even arranging the stored audio in a customized way. The control application can also be used to delete and/or overwrite the stored audio for a fresh playlist. Finally, the control application can be used to play, pause, forward, rewind and/or adjust a volume of playing of the stored streaming audio.

In some implementations, the headphone device can be pre-programmed to receive streaming audio segments at regular intervals, or when one or more sensors on the audio delivery device 104 sense that the audio delivery device 104 is not in the aquatic environment, and/or ready to receive and store the streaming audio. For example, a system can be configured to receive a predetermined time amount of audio as the audio segment(s), or a predetermined data volume. Other customizations are possible, such as only storing certain songs with a particular beat, rhythm, genre, melody, theme, interval, or any other element or defining characteristic of the audio stream.

Alternatively, the control application can initiate different times when receiving and storing audio storing is performed, i.e., based on a time of day, day of week etc. and/or any time the headphone device is connected to a charger, for example. The control application can be configured to allow a user to define when the headphone device may connect to the streaming audio service to receive new or additional streaming audio to be stored in the device. The audio may or may not be played by the user in real-time but can be stored in a memory of the audio delivery device 104 to be played later, such as when the audio delivery device 104 is being used in the aquatic environment.

Accordingly, when in an aquatic environment and out of the reach from RF signals, the user may play the stored audio and not be restricted by the wireless RF attenuation and reception of wireless signals under water.

FIG. 2 is a flowchart of a method 200 of playing streaming media such as audio from a streaming audio service through a headphone device in an aquatic environment, where the headphone device is a waterproof headphone with wireless connectivity. At 202, when not in the aquatic environment, the headphone device is connected to a streaming audio service, either directly to an audio server or to an electronic communication device such as a smartphone that runs a streaming audio application ("app") that receives streaming audio from the audio server. At 204, the streaming audio is received by the headphone device, either directly or via the electronic communication device. Preferably, the headphone device receives the streaming audio wirelessly, via a wireless channel such as Bluetooth®, WiFi, cellular, or the like.

At 206, the received streaming audio is stored in a memory associated with the headphone device, such as local memory embedded in a waterproof housing or encasement that forms at least part of the headphone device. A control application can be used to control the headphone device with such functions as a selecting a duration and/or amount of audio to store, arranging the stored audio in a customized way such as multiple folders or audio files. The control application can also be used to delete and/or overwrite the stored audio for a fresh playlist, and for various functions such as start, stop, and pause the loading of audio at this step.

At 208, when in the aquatic environment, the user can control the headphone device to play the stored streaming audio, preferably using waterproof control buttons on the headphone device. At 210, which can occur at any stage of the method 200, parameters for receiving, storing, overwriting, and organizing streaming audio can be configured and set, either by an application running on a paired electronic communication device such as a smartphone, or by a control application running on the headphone device itself.

Although a few embodiments have been described in detail above, other modifications are possible. Other embodiments may be within the scope of the following claims.

The invention claimed is:

1. A method of playing streaming audio by a wireless audio delivery device when the audio delivery device is in a wireless limited environment, the method comprising:
  connecting, via a streaming media application executing on an electronic communication device, with a streaming media service via the Internet;
  receiving, by the streaming media application, streaming audio from the streaming media service over a first wireless connection;
  transmitting, by the electronic communication device, the streaming audio to the wireless audio delivery device via a second wireless connection while the audio delivery device is not in the wireless limited environment;
  storing the streaming audio received via the second wireless connection in a memory associated with the audio delivery device when the audio delivery device is not in the wireless limited environment; and
  playing, by the audio delivery device, the streaming audio stored in the memory when the audio delivery device enters the wireless limited environment and the first wireless connection is unavailable.

2. The method in accordance with claim 1, wherein the storing further comprises segmenting the streaming audio into one or more segments, each of the one or more segments having a duration and/or volume.

3. The method in accordance with claim 1, wherein the connecting and receiving are performed via a wireless connection with an audio server via the Internet.

4. The method in accordance with claim 3, the electronic communication device is separate from the audio delivery device and connected with the audio delivery device by the second wireless connection.

5. The method in accordance with claim 1, wherein the receiving and storing are controlled based on user implemented parameters when the audio delivery device is not in the wireless limited environment.

6. The method in accordance with claim 1, wherein the storing further comprises overwriting previously stored streaming audio.

7. The method in accordance with claim 1, wherein the playing is enabled when the audio delivery device is in the wireless limited environment.

8. The method in accordance with claim 1, wherein the wireless limited environment is an aquatic environment.

9. The method in accordance with claim 1, wherein the audio delivery device is a wireless waterproof headphone device.

10. The method in accordance with claim 1, wherein the audio delivery device is a speaker with wireless capability.

11. A system for playing streaming audio in a wireless limited environment, the system comprising:
  a streaming media application that is executable on an electronic communication device, the streaming media application being configured for connecting with a streaming media service via the Internet and receiving streaming audio from the streaming media service over a first wireless connection;
  an audio delivery device connectable to the electronic communication device over a second wireless connection;
  a memory associated with the audio delivery device, the memory being configured to receive and store the streaming media received from the streaming media service over the second wireless connection when the audio delivery device is not in the wireless limited environment; and
  one or more controls associated with the audio delivery device, the one or more controls being configured to play the streaming media stored in the memory when the audio delivery device is in the wireless limited environment.

12. The system in accordance with claim 11, wherein the electronic communication device is a smartphone, and wherein the first wireless connection includes a cellular and/or WiFi connection.

13. The system in accordance with claim 11, wherein the electronic communication device is integrated with the audio delivery device.

14. The system in accordance with claim 11, wherein the second wireless connection includes a low-power short-range wireless connection.

15. The system in accordance with claim 11, wherein the one or more controls include a control application executable by the audio delivery device.

16. The system in accordance with claim 15, wherein the control application is configured to customize the streaming audio for storage in the memory.

17. The system in accordance with claim 11, wherein the wireless limited environment is an aquatic environment.

18. The system in accordance with claim 11, wherein the audio delivery device is a speaker with wireless capability.

* * * * *